(12) United States Patent
Abernathy et al.

(10) Patent No.: US 8,829,479 B2
(45) Date of Patent: Sep. 9, 2014

(54) ISOLATED HIGH-SPEED DIGITAL INTERFACE FOR VEHICLES

(75) Inventors: Michael Gregory Abernathy, Ellijay, GA (US); Nathaniel Flournoy Lovelace, III, Marietta, GA (US)

(73) Assignee: L-3 Communications Corporation, New York, NY (US)

( * ) Notice: Subject to any disclaimer, the term of this patent is extended or adjusted under 35 U.S.C. 154(b) by 972 days.

(21) Appl. No.: 12/619,152

(22) Filed: Nov. 16, 2009

(65) Prior Publication Data

US 2010/0127193 A1    May 27, 2010

Related U.S. Application Data

(60) Provisional application No. 61/116,797, filed on Nov. 21, 2008.

(51) Int. Cl.
| | | |
|---|---|---|
| *G02B 27/00* | (2006.01) | |
| *B64D 45/02* | (2006.01) | |
| *H02H 1/04* | (2006.01) | |

(52) U.S. Cl.
USPC .......................................... 250/551; 244/1 A

(58) Field of Classification Search
USPC ....................... 250/551; 385/24; 244/1 A, 1 R
See application file for complete search history.

(56) References Cited

U.S. PATENT DOCUMENTS

| | | | | |
|---|---|---|---|---|
| 4,198,118 A | * | 4/1980 | Porter | 385/24 |
| 4,243,890 A | * | 1/1981 | Miller et al. | 250/551 |
| 4,596,048 A | * | 6/1986 | Dunki-Jacobs | 398/141 |
| 4,612,670 A | * | 9/1986 | Henderson | 398/22 |
| 5,023,463 A | * | 6/1991 | Boardman et al. | 250/551 |
| 5,051,601 A | * | 9/1991 | Atobe et al. | 250/551 |
| 5,093,879 A | * | 3/1992 | Bregman et al. | 385/93 |
| 5,128,729 A | | 7/1992 | Alonas et al. | |
| 5,142,157 A | * | 8/1992 | Robinson | 250/551 |
| 5,196,712 A | * | 3/1993 | Nguyen et al. | 250/551 |
| 5,202,567 A | * | 4/1993 | Hamanaka | 250/551 |
| 5,210,427 A | * | 5/1993 | Uchida et al. | 250/551 |
| 5,555,421 A | * | 9/1996 | Enzinna | 713/300 |
| 5,753,929 A | * | 5/1998 | Bliss | 250/551 |
| 5,789,960 A | | 8/1998 | Bower | |
| 6,404,949 B1 | * | 6/2002 | Sargent et al. | 385/24 |
| 6,476,379 B2 | * | 11/2002 | Ando et al. | 250/227.11 |
| 7,310,573 B2 | * | 12/2007 | Stickling | 701/3 |
| 7,359,592 B2 | * | 4/2008 | Truong | 385/24 |
| 7,503,706 B2 | * | 3/2009 | Wipiejewski et al. | 385/89 |
| 7,688,869 B2 | * | 3/2010 | Adam et al. | 370/537 |

(Continued)

*Primary Examiner* — John Lee
(74) *Attorney, Agent, or Firm* — Arthur A. Gardner; Gardner Groff Greenwald & Villanueva, P.C.

(57) ABSTRACT

An apparatus and method for providing an isolated high-speed digital interface for communicating high-speed digital data within a vehicle. In architecture, the interface includes one or more input terminals and one or more output terminals. Each output terminal being associated with one of the one or more input terminals without any electrically conductive path existing between the output terminal and the input terminal, and instead the input terminal and the output terminal are coupled to one another by an optical coupling. The present invention can also be viewed as a method that can be broadly summarized by the following steps, providing at least one input terminal for receiving data and providing at least one output terminal. Wherein the output terminal is associated with the one input terminal without any electrically conductive path existing between the output terminal and the input terminal, are coupled to one another by an optical coupling.

14 Claims, 2 Drawing Sheets

(56) References Cited

U.S. PATENT DOCUMENTS

| | | |
|---|---|---|
| 7,939,792 B2* | 5/2011 | Nyffenegger et al. ... 250/227.11 |
| 2004/0200984 A1* | 10/2004 | Riley ............................ 250/551 |
| 2005/0053335 A1* | 3/2005 | Wipiejewski et al. .......... 385/88 |
| 2005/0069321 A1* | 3/2005 | Sullivan ........................ 398/116 |
| 2005/0228549 A1* | 10/2005 | Stickling ........................... 701/3 |
| 2006/0182152 A1 | 8/2006 | Bi et al. |
| 2007/0129902 A1* | 6/2007 | Orbell ............................. 702/55 |
| 2007/0237452 A1* | 10/2007 | Truong ........................... 385/24 |
| 2010/0127193 A1* | 5/2010 | Abernathy et al. ........... 250/551 |
| 2010/0215376 A1* | 8/2010 | Nyffenegger et al. ........ 398/116 |

* cited by examiner

ISOLATED HIGH-SPEED DIGITAL INTERFACE FOR VEHICLES

CROSS-REFERENCE TO RELATED APPLICATIONS

This application claims the priority benefit of U.S. Provisional Patent Application Ser. No. 61/116,797, filed Nov. 21, 2008, which is hereby incorporated herein by reference.

FIELD OF THE INVENTION

The present invention relates generally to vehicles and more particularly to isolation of high-speed digital data communication within vehicles to prevent transient and/or spurious voltages from being communicated within vehicles.

BACKGROUND OF THE INVENTION

In modern vehicles, including automobiles, trucks, planes, boats, etc., it is common that a need exists for communicating digital data within the vehicle, typically between a computer or processor in the vehicle and some hardware device in the vehicle. Typically, this is accomplished with copper cabling. Unfortunately, the electrical environment of vehicles is not always as controllable as in stationary applications (like in an office setting), which can lead to transient and/or spurious voltages or currents being communicated along the copper cabling. This can damage the computer/processor and/or the hardware device. This can also corrupt the integrity of the data communication. One ready example of such a problem is the transient voltage and currents that can be developed in a vehicle by a lightning strike. This lightning problem is particularly acute for aircraft, as they often are required to operate in the near presence of lightning and the movement of the aircraft through the air can create conditions that actually increase the chances of the aircraft being struck by lightning. When lightning strikes an aircraft, the transient voltages/currents developed within the aircraft can be substantial and if allowed to propagate to the computer/processor and/or hardware device, the damage thereto can be significant.

Known attempts to arrest or isolate voltages and currents developed within vehicles as a result of a lightning strike are generally inadequate. One problem with known isolation solutions is that they are generally too large for good use in vehicles (including aircraft). Another drawback to existing isolation solutions is that the data transmission rates for such arrangements are unacceptably low. Typical optical isolators operate at kilobits per second rates and do not support differential signals. Moreover, transformer isolation techniques have generally poor application in vehicles as they introduce losses and distortions unacceptable for extended cable runs (greater than 5 meters).

For example, with the proliferation of commercial standards recently, the military is attempting to adopt a number of high-speed interconnect protocols that have physical implementations that are not compatible with aircraft lightning environmental requirements. The high-speed protocols with DC coupling requirements, digital visual interface (DVI), for example are the most difficult to integrate as a communications link between two enclosures separated by more than two or three feet. When an aircraft is struck by lightning, as much as 200,000 amperes may pass through the skin of the metal aircraft. This high current can cause voltage potential differences between the enclosures to be in excess of 300V and thus 600 amperes may flow along the surface of the shielded cables between enclosures. When this high current flow happens in a cable shield, common mode voltage threats can exceed 60V, depending on the cable length, transfer impedance, number of cables in a given bundle, etc. Today's high-speed protocols that use differential signaling typically can be damaged by as little as 0.5V. Due to the low level signal involved with a communications link, typically as low as 800 $mV_{p-p}$ from a single source, traditional surge suppression techniques with load capacitances in the thousands of picofarads are not compatible with signal integrity constraints and requirements. Known ESD (Electro Static Discharge) suppression devices compatible with low voltage differential signaling cannot handle the induced energy from a lightning strike either.

Accordingly, it can be seen that a need yet remains for an isolation system or device that can communicate high-speed data, but yet can provide highly effective electrical isolation to arrest or isolate transient or spurious voltages and currents that can develop in vehicles. It is to the provision of such an isolation device that the present invention is primarily directed.

SUMMARY OF THE INVENTION

Embodiments of the present invention provide an apparatus for providing an isolated high-speed digital interface.

Briefly described, in architecture, one embodiment of the system, among others, can be implemented as follows. An isolated high-speed digital interface for vehicles for communicating high-speed digital data within a vehicle. The interface includes one or more input terminals and one or more output terminals. Each output terminal being associated with one of the one or more input terminals without any electrically conductive path existing between the output terminal and the input terminal, and instead the input terminal and the output terminal are coupled to one another by an optical coupling.

The present invention can also be viewed as a method for providing an isolated high-speed digital interface for communicating high-speed digital data within a vehicle. In this regard, one embodiment of such a method, among others, can be broadly summarized by the following steps: providing at least one input terminal for receiving data; and providing at least one output terminal, wherein the output terminal is associated with the one input terminal without any electrically conductive path existing between the output terminal and the input terminal. In addition, the input terminal and the output terminal are coupled to one another by an optical coupling.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION

Figure 1:
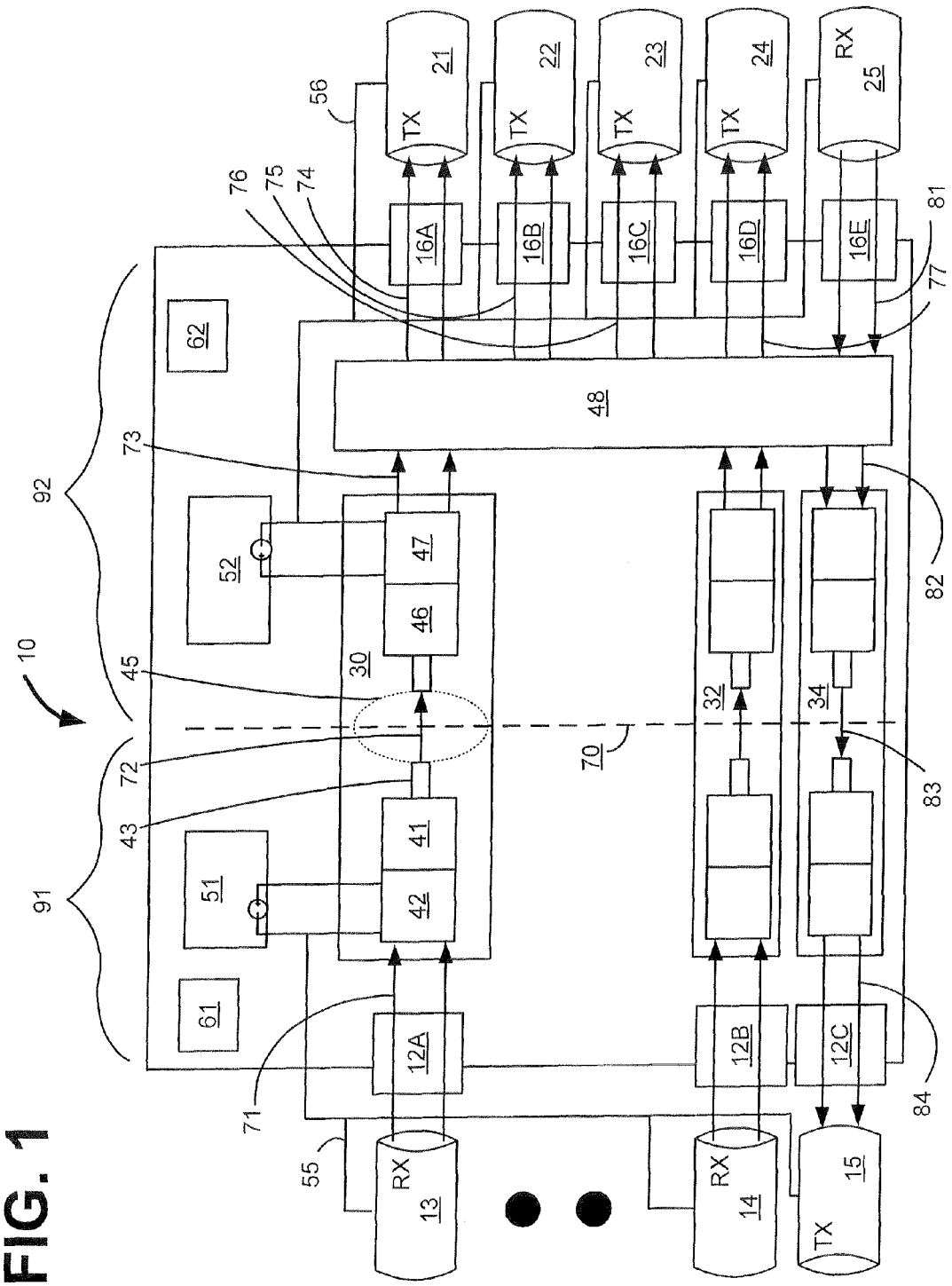
FIG. 1 is a schematic illustration of an isolated high-speed digital interface for vehicles for communicating high-speed digital data within a vehicle, according to a first preferred form of the invention.

In a first preferred form, the present invention comprises an isolated high-speed digital interface for vehicles for communicating high-speed digital data within a vehicle. The interface includes one or more input terminals and one or more output terminals. Each of the output terminals is associated with one of the one or more input terminals without any electrically conductive path existing between the output terminal and the input terminal. Instead, the input terminal and the output terminal are coupled to one another by an optical coupling. Preferably, the optical coupling comprises an emitter and a detector. In one preferred form, the emitter comprises a laser. In another preferred form, the emitter comprises a vertical-cavity surface-emitting laser (VCSEL). Alternatively, the emitter can comprise a light emitting diode. In one preferred form, the detector comprises an avalanche photo diode (APD). In another preferred form, the detector comprises an InGaAs or GaAs PIN photodiode.

Preferably, the isolated high-speed digital interface includes a first power supply for powering an emitter and a second power supply for powering a detector, with the second power supply being separate from the first power supply and electrically isolated from one another.

The isolated high-speed digital interface can include multiple input terminals and multiple output terminals together comprising a plurality of ganged terminals. The ganged terminals can be arranged such that two or more ganged terminals are provided for communicating in a first direction and two or more ganged terminals are provided for communicating in an opposite direction. In this way, bi-directional communication can be provided while still providing outstanding electrical isolation.

As described herein, preferably the optical isolation is provided through an air gap, such as by an emitter and a detector separated by an air gap. Alternatively, a fiber-optic link can be substituted to provide the electrical isolation while still allowing high-speed data communication. It is believed that in many vehicle applications, the harsh environment of the vehicle and/or serviceability considerations tend to make the air gap a somewhat better choice than a fiber-optic link. The transmission rates of 100 Megabits per second to 40 Gigabits per second can be obtained using as few as one emitter/detector optical coupling in a high-speed digital isolator according to the present invention.

The present invention comprises a high-speed optical isolator, which can be implemented using commercially available electro-optical components. For Example, by using individual optical transmitters and receivers and a hollow ceramic sleeve between the emitter/detector to maintain alignment, a multi-gigabit per second data rate optical isolator is obtained.

Electrical data link isolation is achieved by replacing data carrying wires with free-space optical signaling. An optical transmitter and receiver pair is electrically isolated by means of separate power and no direct electrical connections. The optical transmitter consists of a laser driver IC and a commercial TOSA (Transmitter Optical Subassembly) and an optical receiver ROSA (Receiver Optical Subassembly) driving a limiting amplifier that outputs digital signals. The two electrical sections of the PCB carrying the transmitting and receiving electronic circuitry are electrically isolated from each other by dielectric, sharing no power or ground planes or signal traces.

Optical alignment between TOSA and ROSA is achieved by mechanical coupling of the two packages. The ROSA and TOSA subassemblies accept ceramic ferrules sliding into a protrusion that is axially and radially aligned with the emitter/photo-detector. This protrusion is designed as a receptacle for the 1.25 mm ferrule used with LC optical connectors. By replacing the ferrules with a short tube, the TOSA and ROSA are optically aligned and a free-space optical path results. This arrangement thus provides both a mechanically stable optical alignment of the components, as well as full electrical isolation.

The isolated high-speed digital interface shown herein by way of example comprises input circuitry referenced through the input signal cabling back to the input signal source and output circuitry referenced through the output signal cabling out to the terminating load signal reference.

Advantageously, the isolated high-speed digital interface as described herein comprises input circuitry and output circuitry that maintain less than 1 uf parasitic capacitance with respect the two primary input references of the associated isolated power supplies, respectively.

Optionally, the isolated high-speed digital interface can include one or more temperature controllers for maintaining the temperature of the emitter(s) and/or the detector(s) to provide good, steady performance of the optical interface over a range of vehicle operating circumstances and conditions.

Optionally, the isolated high-speed digital interface can take the form of a compact housing with an external input connector and an external output connector for coupling to input and output cabling, respectively. Such a housing-based interface can be adapted for mounting inside a vehicle, such as an aircraft, for providing protection against transient voltages caused by lightning strikes against the vehicle.

Alternatively, the isolated high-speed digital interface can be implemented on a computer card adapted to be plugged into a computer expansion slot to enable an external hardware device to communicate with a computer while electrically isolating the computer and the external hardware device from one another.

In a preferred form, the optical isolation is provided through an air gap, such as by an emitter and a detector separated by an air gap. Alternatively, a fiber-optic link can be substituted to provide the electrical isolation while still allowing data communication. It is believed that in many vehicle applications, the harsh environment of the vehicle and/or serviceability considerations tend to make the air gap a somewhat better choice than a fiber-optic link.

Referring now to the drawing figures, wherein like reference numerals represent like parts throughout the several views, FIG. 1 shows a high-speed optical isolator 10 for use in vehicles. As shown in FIG. 1, the high-speed optical isolator 10 as an input connectors 12A, 12B and 16E, for connection to differential high-speed inputs, such as input terminals 13, 14 and 25. The high-speed optical isolator 10 also includes an output connector's 12C and 16A-D for connecting to differential outputs, such as outputs 15, 21, 22, 23, and 24. As shown in this figure, the high-speed optical isolator 10 can include multiple input terminals and multiple output terminals together comprising a plurality of ganged terminals. As shown in FIG. 1, most of the optical couplings were oriented in one direction such that the high-speed optical isolator 10 is shown for use with most data flowing in one direction only. However, the high-speed optical isolator 10 could be provided with some optical couplings oriented one direction and other optical couplings oriented in another direction, as shown with input terminal 25 that connects to differential output 15. In this way, the ganged terminals can be arranged such that two or more ganged terminals are provided for communicating in a first direction and two or more ganged terminals are provided for communicating in an opposite direction. In this way, bi-directional communication can be provided while still providing outstanding electrical isolation, as will be made clearer below. While FIG. 1 shows 5 input terminals and 5 output terminals, the number of transmission or receiving terminals on either side of the high-speed optical isolator 10 is limited only by the package constraints.

Importantly, each of the output terminals 15, 21-24 is associated with one of the one or more input terminals 13, 14 and 25 without any electrically conductive path existing between the output terminal and the input terminal. Instead, the input terminal and the output terminal are coupled to one another by an optical coupling, such as couplings 30, 32 and 34. Preferably, the optical coupling comprises an emitter and a detector, such as emitter 41 and detector 46. The emitter 41 is driven by an appropriate driver 42 and the detector 46 is provided with appropriate amplifier 47 for amplifying the detected signal from the detector 46. In one preferred form, the emitter 41 comprises a laser 43 and the driver 42 comprises a laser driver. In another preferred form, the emitter 41 comprises a VCSEL and the driver 42 comprises a VCSEL driver. Alternatively, the emitter 41 can comprise a light emitting diode.

The optical interface or coupling between the emitter 41 and detector 46 may be operated at any of the numerous convenient wavelengths. The numerous convenient wavelengths include for example, but not limited to, the emitter/detector coupling that can be operated at 850 nm, 1310 nm, or 1550 nm.

The emitter 41 and the detector 46 are physically arranged more or less nose to nose with a small air gap 45 between the two. Thus, there is no electrical connection between the emitter 41 and a detector 46. Therefore, there is no electrical connection between the input connector 12 and the output connector 16. Thus, no electrical conductive pathway is provided in the high-speed optical isolator 10. To further provide excellent electrical isolation between the input and output sides of the device, the emitter 41 and the detector 46 are each powered by separate, isolated power supplies, such as power supplies 51 and 52.

As shown in FIG. 1, differential high-speed input 13 provides a communication link transmitting a signal 71 through input connector 12A into driver 42 which drives emitter 41 to produce an optical signal 72. Examples of the types of communication links include, but are not limited to, emitter-coupled logic (ECL), Low-voltage positive emitter-coupled logic (LVPECL), Positive emitter-coupled logic (PECL), Current mode logic (CML), voltage-mode logic (VML), Low-voltage differential signaling (LVDS), Multipoint LVDS (M-LVDS) and the like. The differential high-speed input 13 may utilize many different types of communication links that include, but are not limited to, the Avionics Digital Video Bus, Fibre Channel, DVI and HDMI, Ethernet, coax, RS-232, RS-423, RS-485, USB, Firewire, InfiniBand, SpaceWire, T1, E1, SDI-12, Serial ATA and/or other like means.

This optical signal 72 is received by detector 46, which is then provided to the appropriate amplifier 47 for amplifying the detected optical signal 72 from the detector 46. In one preferred form, the emitter 41 comprises a laser 43 and the driver 42 comprises a laser driver. In another preferred form, the emitter 41 comprises a VCSEL and the driver 42 comprises a VCSEL driver. Alternatively, the emitter 41 can comprise a light emitting diode. Amplifier 47 transmits the amplified signal 73 into a protocol buffer 48.

The protocol buffer 48 or repeater provides data transmission into any number of communication link types. Examples of the types of communication links include, but are not limited to, ECL, LVPECL, PECL, CML, VML, LVDS, M-LVDS and the like. After providing for data transmission, the protocol buffer 48 and transmits the output signal 74-77 through the output connector 16 A-D for transmission to the appropriate output connector 21-24. As shown in FIG. 1, the number of the input terminals equals the number of output terminals. In one embodiment, the protocol buffer 48 connect two or more high-speed communication links, which maps one differential high-speed input to one differential high-speed output. In an alternative embodiment, the protocol buffer may also act as a repeater to route and forward information from one high-speed input to two or more differential high-speed outputs.

Furthermore, either the power supplies or any other components from the input and output sides are provided with a common reference 55 and 56 (e.g., ground), to avoid providing electrically conductive pathway between the input and output sides of the high-speed optical isolator 10. By providing separate power supplies 51 and 52, the input can be referenced back to the source and the output that now becomes the new reference. This breaks the metal current carrying path and minimizing the common mode threat. This can be important to minimize stray capacitance between the two circuits, so as to obtain maximum isolation. The stray capacitance may ultimately determine the common mode threat level induced by lightning currents.

As shown in FIG. 1, optionally, the high-speed optical isolator 10 can include one or more temperature controllers 61, 62 for maintaining the temperature of the emitter(s) and/or the detector(s) to provide good, steady performance of the optical interface over a range of vehicle operating circumstances and conditions. Here again, the temperature controllers 61, 62 are separate and are not electrically connected to one another, but instead are likely isolated from one another. It is noted that temperature control is normally more important for emitters than for detectors inasmuch as the output from emitters varies more widely with temperature than does the performance of emitters.

As shown in FIG. 1, this design results in an optical isolation boundary 70 between the input side 91 and the output side 92 of the unidirectional high-speed optical isolator 10 depicted in FIG. 1.

Figure 2:
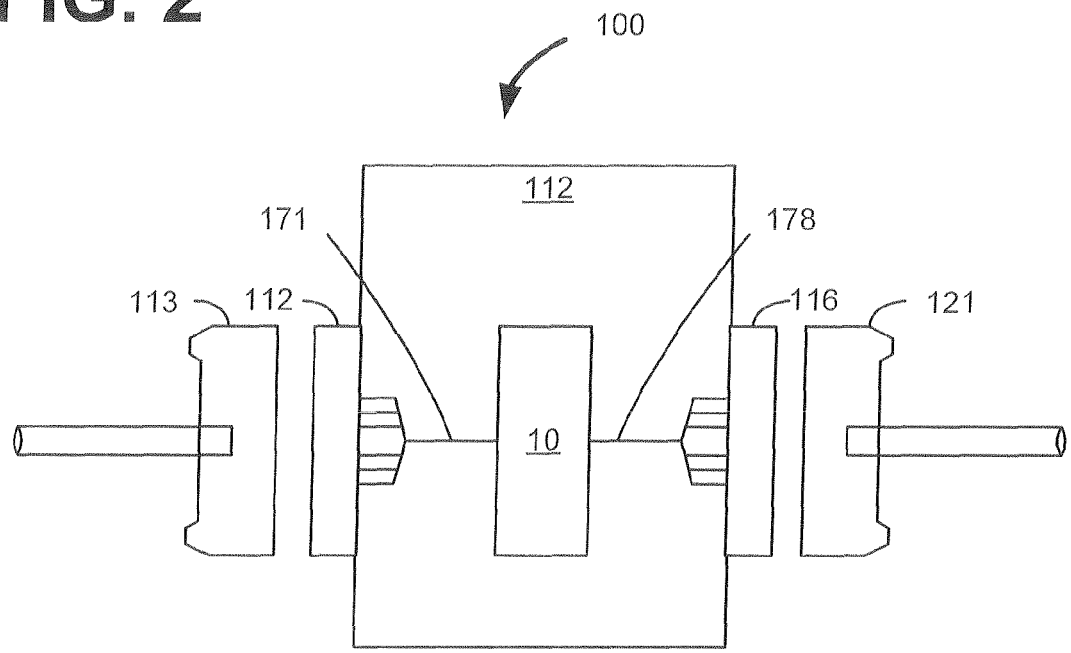
FIG. 2 is a schematic perspective view of a coupler incorporating the isolated high-speed digital interface of FIG. 1 and adapted to allow two cables and/or devices to be connected while providing isolation.

As shown in FIG. 2, optionally, the high-speed optical isolator 10 can take the form in a compact housing 100 with an external input connector 112 and an external output connector 116 for coupling to input 113 and output 121 cabling, respectively. As shown, external input connector 112 and output connector are connected to the high-speed optical isolator 10 through connection 171 and 178, respectively. Such a compact housing 100 can be adapted for mounting inside a vehicle, such as an aircraft, for providing protection against transient voltages caused by lightning strikes against the vehicle. Indeed, the present design is well-suited to relatively small implementation as it can be conveniently and compactly mounted within such a compact housing 100. Such relatively small housings find ready use in vehicles where space is often constrained.

Figure 3:
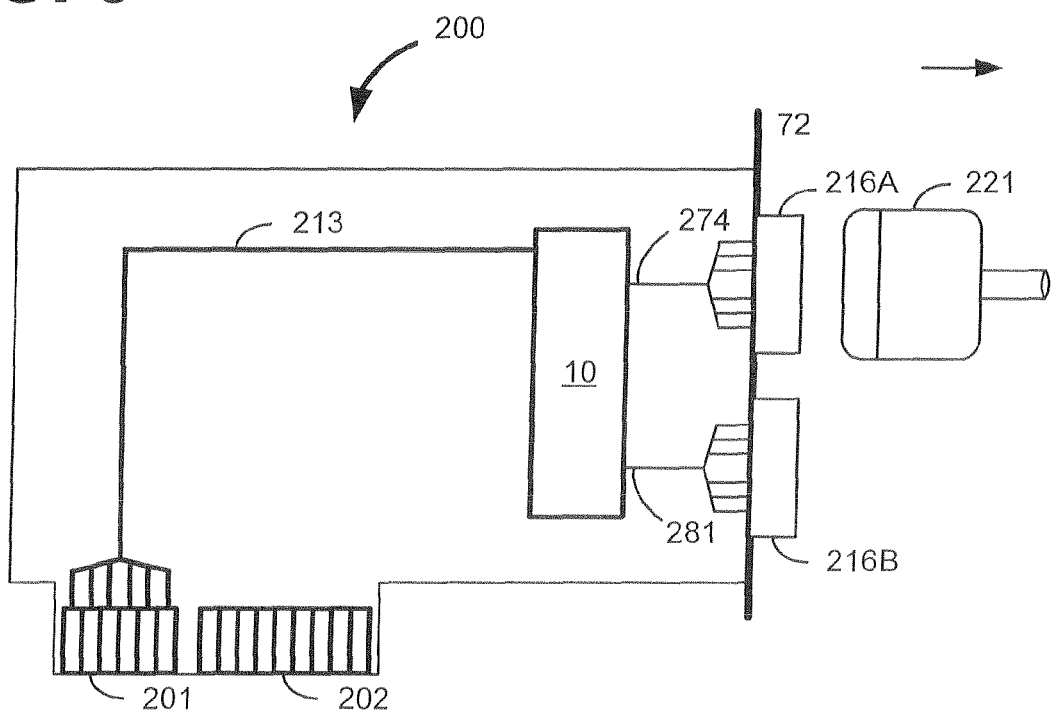
FIG. 3 is a schematic view of a PC card incorporating the isolated high-speed digital interface of FIG. 1 and adapted to allow one or more external devices to be connected to a computer or processor while providing isolation.

As shown in FIG. 3, alternatively, the high-speed optical isolator 10 can be implemented on a computer card 200 adapted to be plugged into a computer expansion slot to enable an external hardware device to communicate with a computer while electrically isolating the computer and the external hardware device from one another. For example, an external hardware device may connect to the computer card 200 using connector 221 plugged into receiver 216A or 216B. The signals received from the external hardware device transmitted through connector 221 and receiver 216 (A or B) are transmitted to the high-speed optical isolator 10 through communication link 274 or 281. The output from the high-speed optical isolator 10 is then transmitted via communication link 213 to the computer expansion slot connectors 201. In this way, any external hardware device is connected to and electrically isolated from a computer through computer card 200.

As described herein, preferably the optical isolation is provided through an air gap, such as by an emitter and a detector separated by an air gap. Alternatively, a fiber-optic link can be substituted to provide the electrical isolation while still allowing high-speed data communication. It is believed that in many vehicle applications, the harsh environment of the vehicle and/or serviceability considerations tend to make the air gap a somewhat better choice than a fiber-optic link. The transmission rates of 100 Megabits per second to 40 Gigabits per second can be obtained using as few as one emitter/detector optical coupling in a high-speed digital isolator according to the present invention.

The present invention comprises a high-speed optical isolator, which can be implemented using commercially available electro-optical components. For Example, by using individual optical transmitters and receivers and a hollow ceramic sleeve between the emitter/detector to maintain alignment, a multi-gigabit per second data rate optical isolator is obtained.

In one embodiment, the electrical data link isolation is achieved by replacing data carrying wires with free-space optical signaling. An optical transmitter and receiver pair is electrically isolated by means of separate power and no direct electrical connections. The optical transmitter consists of a laser driver IC and a commercial TOSA (Transmitter Optical Subassembly) and an optical receiver ROSA (Receiver Optical Subassembly) driving a limiting amplifier that outputs digital signals. The two electrical sections of the PCB carrying the transmitting and receiving electronic circuitry are electrically isolated from each other by dielectric, sharing no power or ground planes or signal traces.

Optical alignment between TOSA and ROSA is achieved by mechanical coupling of the two packages. The ROSA and TOSA subassemblies accept ceramic ferrules sliding into a protrusion that is axially and radially aligned with the emitter/photo-detector. This protrusion is designed as a receptacle for the 1.25 mm ferrule used with LC optical connectors. By replacing the ferrules with a short tube, the TOSA and ROSA are optically aligned and a free-space optical path results. This arrangement thus provides both a mechanically stable optical alignment of the components, as well as full electrical isolation.

The isolated high-speed digital interface shown herein by way of example comprises input circuitry referenced through the input signal cabling back to the input signal source and output circuitry referenced through the output signal cabling out to the terminating load signal reference.

While this invention has been described in detail with particular reference to exemplary embodiments and variations thereof, it is to be understood that other variations and modifications can be effected within the scope and spirit of the invention, as described above and as defined in the appended claims.

What is claimed is:

1. An isolated unidirectional digital interface for vehicles for communicating digital data within a vehicle, the digital interface comprising:
   one or more input terminals;
   one or more emitters associated with the one or more input terminals;
   a first power supply associated with the one or more emitters for powering the emitters;
   one or more detectors optically coupled to the one or more emitters;
   one or more output terminals, with each output terminal being associated with one of the one or more detectors,
   a second power supply associated with the one or more detectors for powering the detectors, and wherein the second power supply is electrically isolated from the first power supply; and
   wherein the digital interface is configured without any electrically conductive path existing between an output terminal and an input terminal, and instead the one or more input terminals and the one or more output terminals are coupled to one another by an optical coupling.

2. An isolated digital interface as claimed in claim 1, wherein the optical coupling provides an isolated high-speed digital interface capable of communicating digital data at rates in excess of 150 Mbps.

3. An isolated high-speed digital interface as claimed in claim 2, wherein the emitter comprises a laser.

4. An isolated high-speed digital interface as claimed in claim 2, wherein the emitter comprises a VCSEL.

5. An isolated high-speed digital interface as claimed in claim 2, wherein the emitter comprises a light emitting diode.

6. An isolated digital interface as claimed in claim 1, wherein the one or more input terminals and the one or more output terminals comprise a plurality of ganged terminals.

7. An isolated digital interface as claimed in claim 1, further comprising one or more temperature controllers for maintaining the temperature of the emitter and/or the detector.

8. An isolated digital interface as claimed in claim 1, further comprising a compact housing with an external input connector and an external output connector for coupling to input and output cabling respectively.

9. An isolated digital interface as claimed in claim 8, wherein the housing is adapted for mounting inside an aircraft for providing protection against transient voltages caused by lightning strikes against the aircraft.

10. An isolated digital interface as claimed in claim 8, further comprising output circuitry referenced through the output cabling out to a terminating load signal reference.

11. An isolated digital interface as claimed in claim 8, further comprising input circuitry and output circuitry that maintain less than 1 of parasitic capacitance with respect to primary input references of the first and second power supplies.

12. An isolated digital interface as claimed in claim 8, further comprising input circuitry referenced through the input cabling back to an input signal source.

13. An isolated digital interface as claimed in claim 1 wherein the interface is implemented on a computer card adapted to be plugged into a computer expansion slot to enable an external hardware device to communicate with a computer while electrically isolating the computer and the external hardware device from one another.

14. An isolated digital interface for vehicles for communicating digital data within a vehicle, the digital interface comprising:
- one or more input terminals;
- one or more emitters associated with the one or more input terminals;
- a first power supply associated with the one or more emitters for powering the emitters;
- one or more detectors optically coupled to the one or more emitters;
- one or more output terminals, with each output terminal being associated with one of the one or more detectors,
- a second power supply associated with the one or more detectors for powering the detectors, and wherein the second power supply is separate from the first power supply; and
- wherein the digital interface is configured without any electrically conductive path existing between an output terminal and an input terminal to resist lightning strikes, and instead the one or more input terminals and the one or more output terminals are coupled to one another by an optical coupling, and further wherein the digital interface is capable of communicating digital data at rates in excess of 150 Mbps.

* * * * *